（12）United States Patent
Makki et al.

(10) Patent No.: US 9,097,166 B2
(45) Date of Patent: Aug. 4, 2015

(54) INTEGRATED FUEL CATALYST MONITOR (71) Applicant: Ford Global Technologies, LLC, Dearborn, MI (US)

(72) Inventors: Imad Hassan Makki, Dearborn Heights, MI (US); Pankaj Kumar, Houston, TX (US); Dimitar Petrov Filev, Novi, MI (US); Timothy Robert Gernant, Ann Arbor, MI (US); Michael Casedy, Ann Arbor, MI (US); Brent Edward Sealy, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 238 days.

(21) Appl. No.: 13/849,411

(22) Filed: Mar. 22, 2013

(65) Prior Publication Data
US 2014/0283589 A1    Sep. 25, 2014

(51) Int. Cl.
*F01N 11/00*    (2006.01)

(52) U.S. Cl.
CPC .............. *F01N 11/00* (2013.01); *F01N 11/007* (2013.01); *F01N 2560/20* (2013.01); *Y02T 10/47* (2013.01)

(58) Field of Classification Search
CPC ... Y02T 10/47; F01N 2550/02; F01N 11/007; F01N 11/00; F01N 2560/20
USPC ...................................................... 73/114.75
See application file for complete search history.

(56) References Cited

U.S. PATENT DOCUMENTS

| 6,449,943 | B1* | 9/2002 | Ueno et al. ....................... 60/274 |
| 7,900,439 | B2* | 3/2011 | Genslak et al. .................. 60/277 |
| 8,516,796 | B2* | 8/2013 | Wald et al. ....................... 60/277 |
| 8,756,915 | B2* | 6/2014 | Sealy et al. ...................... 60/277 |
| 8,800,356 | B2* | 8/2014 | Makki et al. ................. 73/114.75 |
| 2002/0029561 | A1* | 3/2002 | Ueno et al. ....................... 60/277 |
| 2008/0302087 | A1* | 12/2008 | Genslak et al. .................. 60/277 |
| 2011/0083425 | A1* | 4/2011 | Sealy et al. ...................... 60/277 |
| 2011/0120095 | A1* | 5/2011 | Wald et al. ....................... 60/276 |
| 2013/0078725 | A1 | 3/2013 | Makki et al. |
| 2013/0180509 | A1 | 7/2013 | Makki et al. |
| 2013/0245919 | A1* | 9/2013 | Kumar et al. ................. 701/104 |

OTHER PUBLICATIONS

Ulrech, Michael James, et al., "Integrated Fuel Catalyst Monitor," U.S. Appl. No. 13/892,061, filed May 10, 2013, 33 pages.

* cited by examiner

*Primary Examiner* — Freddie Kirkland, III
(74) *Attorney, Agent, or Firm* — Julia Voutyras; Alleman Hall McCoy Russell & Tuttle LLP (57) ABSTRACT

A method of monitoring catalyst performance may comprise applying a set of parameter readings for a given sample to a support vector machine to generate a classification output, clustering the set of parameter readings to reduce a number of support vectors, computing a total fuel mass following a deceleration fuel shut-off event and an exhaust gas oxygen sensor switch and indicating catalyst degradation based on the total fuel mass.

20 Claims, 7 Drawing Sheets

INTEGRATED FUEL CATALYST MONITOR

FIELD

The present disclosure relates to a catalyst monitoring system.

BACKGROUND AND SUMMARY

Emission control devices, such as a three-way catalyst, coupled to the exhaust of a combustion engine reduce combustion by-products such as carbon monoxide, hydrocarbons, and oxides of nitrogen. To reduce emissions, catalyst monitoring methods are used to detect when an emission control device has reached its threshold use and is to be replaced. Reliable catalyst monitoring may reduce costs by decreasing erroneous characterization of useful catalyst as expended catalyst, or may reduce emissions by decreasing erroneous characterization of degraded catalyst as useful catalyst.

Various approaches for catalyst monitoring have been developed including methods provided for monitoring an emission control device comprising following a deceleration fuel shut-off duration, indicating degradation of the emission control device based on an integrated air-fuel and steady-state based index ratio diagnostic method. Support vector machine algorithms have further been applied to catalyst monitoring systems for classifying integrated air-fuel parameters to provide the degradation indication.

The inventors herein have recognized issues with the above approaches. Namely, the index ratio method has been proven to work only with partial volume systems. Furthermore, existing integrated air-fuel methods do not perform well in vehicles such as a limousine, in which an after-treatment system may be located farther away from a universal exhaust gas oxygen upstream sensor as compared to that in a more regularly sized vehicle. Thus, the capability and robustness of traditional catalyst monitoring methods may be reduced owing to large transport delays between the upstream universal exhaust-gas oxygen sensor and the air-fuel sensor downstream from the catalyst. Further still, support vector machine algorithms may use large amounts of memory, arising from a number of support vectors needed to define the classification plane.

One approach that at least partially addresses the above issues comprises a method of monitoring catalyst performance comprising computing a total fuel mass following a deceleration fuel shut-off event until a heated exhaust gas oxygen sensor switch. In particular, the method may include computing a transport delay to account for vehicles in which the after-treatment system is located farther away from an upstream exhaust gas oxygen sensor. Furthermore, catalyst degradation may be indicated based on the total fuel mass by applying a set of parameter readings to a support vector machine, wherein the support vector machine may employ clustering algorithms and/or a buffer region to reduce the number of support vectors. By computing a total fuel mass, the catalyst monitoring method can be made robust for both partial and full volume systems. In this manner, a catalyst monitoring method is described, providing increased robustness for partial and full volume systems and those with large transport delays, and having reduced memory usage as compared with traditional catalyst monitoring methods.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
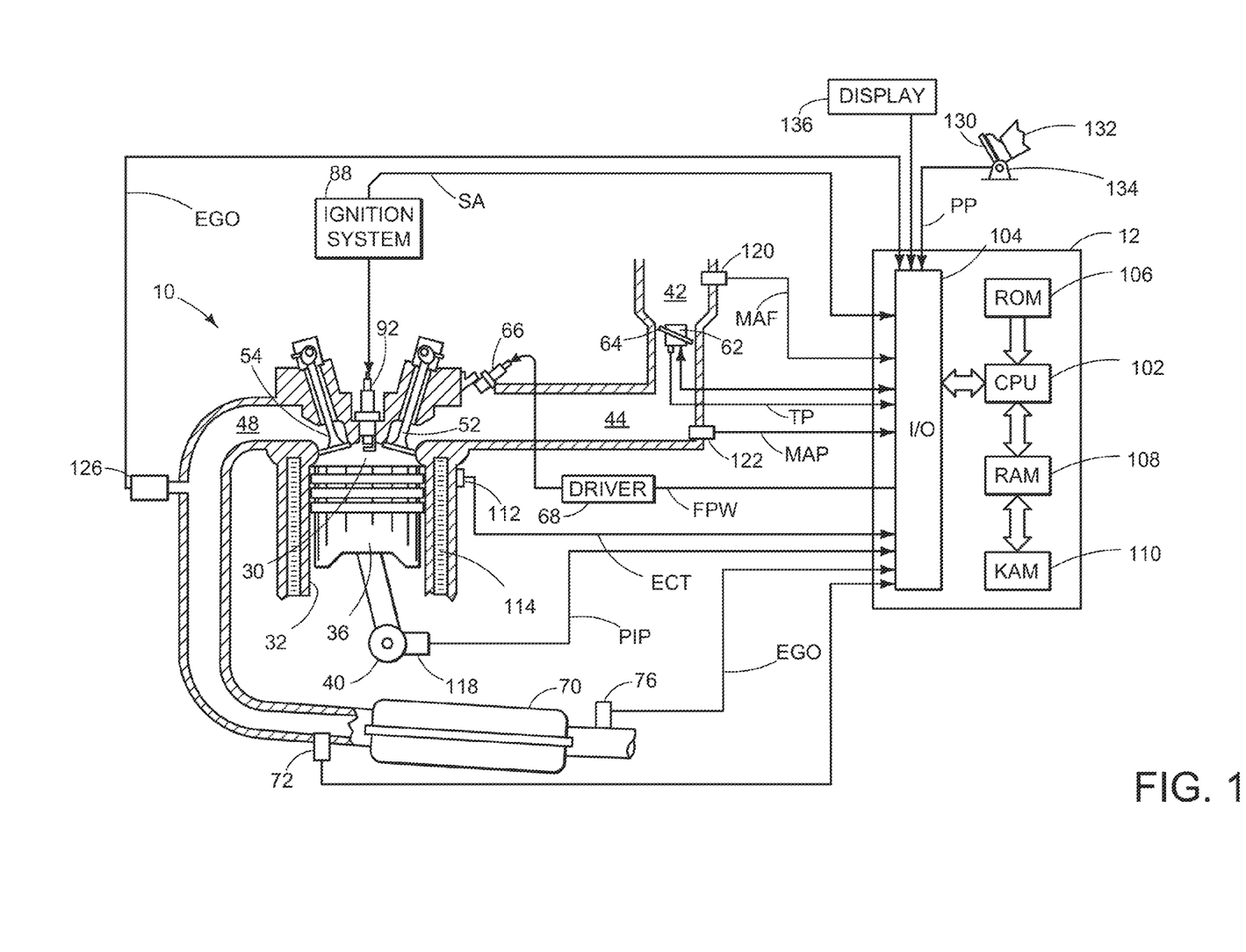
FIG. 1 shows a schematic diagram of an example cylinder of a multi-cylinder engine with an emission control device coupled to the engine exhaust system.
Figure 2:
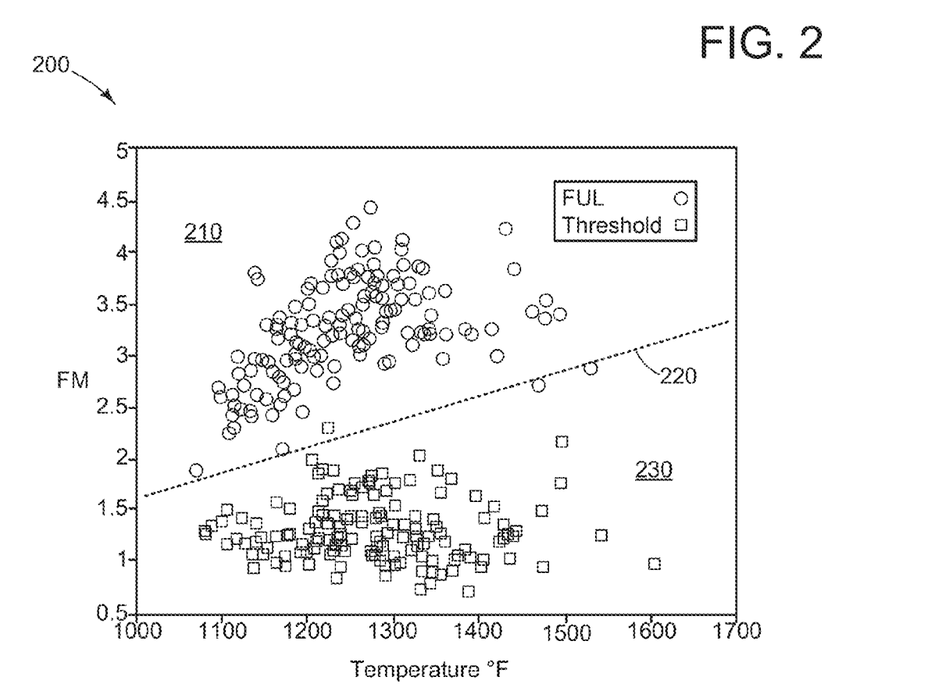
FIGS. 2-3 show example plots corresponding to a support vector machine classification.
Figure 3:
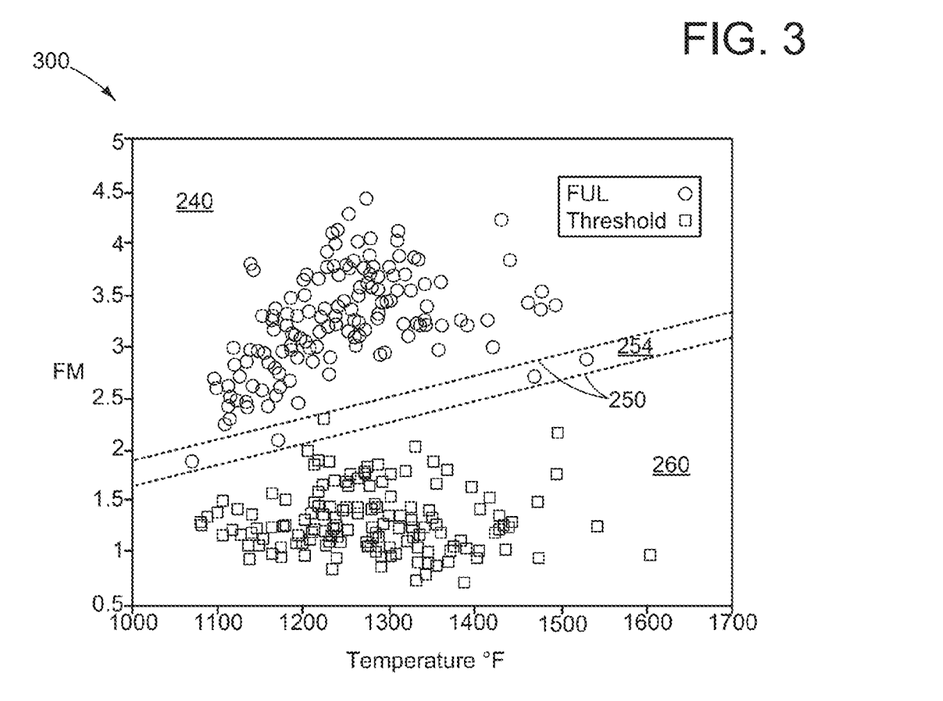
Figure 4:
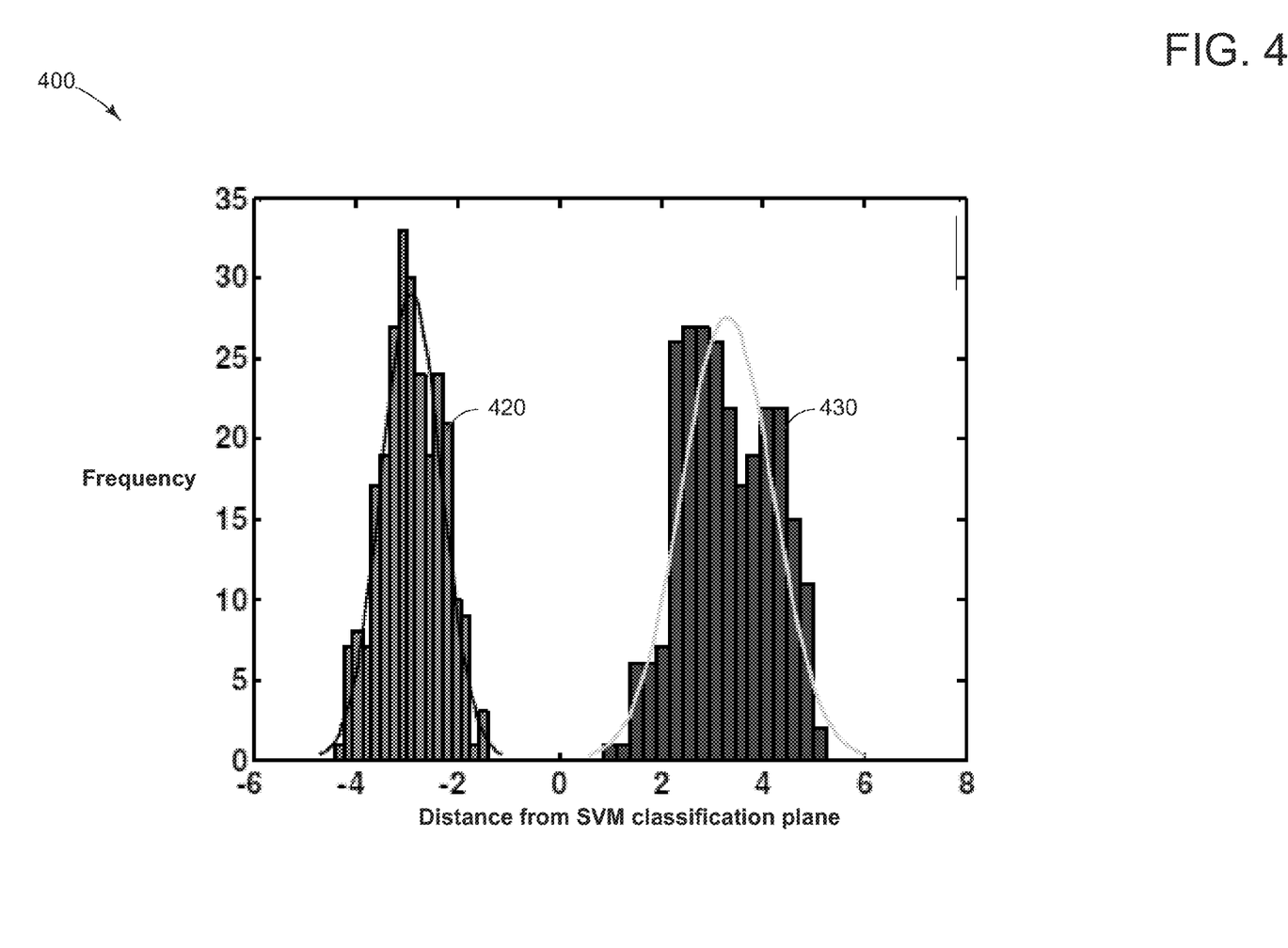
FIG. 4 shows an example histogram corresponding to a support vector machine classification.

The following description relates to a system and method for monitoring an emission control system following a deceleration fuel shut-off (DFSO) event. FIG. 1 shows an example combustion engine with an emission control device coupled to the exhaust. The catalyst monitoring routine may be initiated following a DFSO event, and following a driver tip-in to exit out of the DFSO event. The example catalyst monitoring method shown in FIGS. 5-7 determines a total fuel mass injected in the emission control device based on an integrated air mass flow (AM) and fuel to air ratio upstream of the emission control device. The fuel mass (FM) is integrated from the end of the DFSO event to a downstream air-fuel sensor switch. The downstream air-fuel sensor may be a full volume sensor or a partial volume sensor. In one example, a transport delay is computed and used to adjust the FM computation. A support vector machine (SVM) algorithm is used to classify the FM computation for determining and providing an indication of catalyst degradation. The SVM algorithm may include a clustering algorithm and a buffer region, as shown in FIGS. 2-4, to increase the robustness and to reduce memory usage. FIG. 8 illustrates examples of variations in fuel mass, air mass, and upstream and downstream air to fuel sensor measurements during catalyst monitoring following a DFSO event.

Turning to FIG. 1, a schematic diagram showing one cylinder of multi-cylinder engine 10, which may be included in a propulsion system of a vehicle, is shown. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (e.g., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio. Full-volume exhaust gas sensor 76 is shown coupled to exhaust passage 48 downstream of emission control device 70. Sensor 76 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Further, a plurality of exhaust gas sensors may be located at partial volume locations within the emission control devices. Other sensors 72 such as an AM and/or a temperature sensor may be disposed upstream of emission control device 70 to monitor the AM and temperature of the exhaust gas entering the emission control device. The sensor locations shown in FIG. 1 are just one example of various possible configurations. For example, the emission control system may include a partial volume set-up with close coupled catalysts.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; AM and/or temperature of the exhaust gas entering the catalyst from sensor 72; exhaust gas air to fuel ratio from sensor 76; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses for each revolution of the crankshaft. Additionally, controller 12 may communicate with a cluster display device 136, for example to alert the driver of faults in the engine or exhaust after-treatment system.

Storage medium read-only memory 106 can be programmed with computer readable data representing instructions executable by processor 102 for performing the methods described below as well as other variants that are anticipated but not specifically listed.

Turning now to FIG. 2, it illustrates a plot corresponding to a Support Vector Machine algorithm classification. A support vector machine (SVM) may be used in a catalyst monitoring method to predict catalyst function. The SVM may be trained using pre-classified, known input parameters. During operation of a vehicle under selected conditions, various unclassified input parameters may be fed into the trained SVM model, and after a pre-defined number of samples have been classified, the total of each classification may be compared to a threshold to determine whether or not the catalyst is functioning.

The SVM is a supervised learning algorithm, where given a training set with known class information, a model may be developed to classify the unknown test samples into different classes. The SVM may process a set of input data and may predict, for each given input, which of two possible classes the input is a member of, which makes the SVM a non-probabilistic binary linear classifier. In one embodiment, the SVM may predict whether or not the exhaust catalyst is properly functioning. The SVM algorithm may be generated via a set of training examples, each marked as belonging to one of two categories. The SVM training algorithm builds a model that assigns new examples into one category or the other. An SVM model is a representation of the examples as points in space, mapped so that the examples of the separate categories are divided by a margin. New examples are then mapped into that same space and predicted to belong to a category based on which side of the margin they fall on.

SVMs use a signum function as a linear classifier to classify the unknown inputs into the two groups based on the training function wherein known inputs are used. Specifically, the known inputs are mapped onto high- or infinite-dimensional space and one or more hyper-planes are chosen that separate the inputs into the two spaced groups. In some examples, a hyper-plane or classification plane that represents the largest margin of separation of the groups is chosen, while in other examples, a hyper-plane or classification plane with a margin that allows for some degree of error in the inputs may be chosen, known as a slack margin. After the model is trained, unknown inputs can be entered and classified into one of the two groups. Typically, the output of the signum function is either +1 or −1, but either classification may be transformed into other values, e.g., −1 may be transformed to 0.

If the known inputs used to train the model cannot be separated using a linear classification, a transformation function may be used with a non-linear classification to separate the inputs. For example, a non-linear classification approach utilizing a kernel function in the SVM for application of the input parameters to predict catalyst performance, along with a soft margin to introduce some slack variables to the classification to allow some misclassification for outlier data points, may be used.

In another example, to increase SVM performance and robustness and to reduce the risk of misclassification of inputs that can lead to false indication of catalyst degradation, clustering algorithms may be applied to the data to further organize (e.g., cluster) the data. Clustering may aid in reducing the number of support vectors used for defining an optimal hyper-plane. One or more of multiple clustering algorithms may be used, such as K-means clustering, Fuzzy C-means clustering, Expectation maximization, subtractive clustering, and the like. The use of clustering thereby reduces the memory usage of the SVM algorithm and increases its robustness by making the model less sensitive to outliers, as compared to SVM algorithms where clustering is not employed.

For catalyst diagnostics, various input parameters may be supplied to the SVM. In previous models, an estimated catalyst gain along with air mass and temperature are used to build an SVM model. In the present description, more fundamental and distinguishing parameters known to vary with catalyst age are used to build an SVM model, which may increase the robustness and performance of the catalyst monitoring as compared to previous SVM models. In one example, the input parameters may include total FM consumed to react with stored oxygen in a catalyst prior to a downstream HEGO sensor switch. In a further example, the input parameters may include the total FM injected following a DFSO event (e.g., wherein the catalysts become saturated with oxygen) until a downstream HEGO sensor switch (e.g., a switch from lean to rich). For example, FM injected to an oxygen-saturated catalyst after a DFSO event until a downstream HEGO sensor switch may provide a robust indication of catalyst degradation. In this manner, greener catalysts may exhibit higher FM than exhausted catalysts, and a threshold FM may be determined or calibrated to catalyst monitoring conditions (e.g., temperature) for indicating catalyst degradation.

The amount of total fuel mass consumed to react with stored oxygen in a catalyst can be represented by equation (1):

$$FM_c = \int_{t_{start}}^{t_{end}} AM(\phi_{in} - \phi_{out}) dt \quad (1)$$

Here, $FM_c$ denotes the amount of fuel mass consumed to react with the stored oxygen in the catalyst after the end of a DFSO event at $t_{start}$ until the HEGO sensor switch at $t_{end}$. AM denotes the air mass flow rate entering the catalyst (e.g., measure by MAF sensor 120 and/or sensor 70), $\phi$ represents the equivalent fuel/air ratio, and the subscripts 'in' and 'out' denote positions before and after the catalyst at midbed (for partial volume systems) or tailpipe (e.g., for full volume systems). $\phi_{in}$ can be measured by an upstream fuel-air sensor such as an UEGO sensor (e.g., sensor 126), and $\phi_{out}$ may be estimated from a downstream HEGO sensor (e.g., sensor 76).

Prior IAF models use an approximation for catalyst oxygen storage capacity according to equation (2):

$$IAF = \int_{t_{start}}^{t_{end}} \frac{AM}{AF_{stoich}} (\phi_{in} - 1) dt \quad (2)$$

In equation 2, $AF_{stoic}$ represents the stoichiometric air to fuel ratio, and $\phi_{in}$ represents the equivalent fuel to air ratio in the catalyst feedgas. $\phi_{in}$ may be computed from the UEGO sensor reading, for example. According to equation (2), IAF may be negative under lean conditions (e.g., $\phi_{in}<1$) and positive under rich conditions. Accordingly, integrating over the time period may create an error in IAF computation, in particular if the rate at which AF transitions from lean to rich is slow. To mitigate this error, IAF monitors use a calibratable AF setpoint for the time period where the sensor still reads lean and then based on a calibratable value switches to the UEGO sensor value. The AF setpoint is an additional parameter that introduces an approximation error as well as additional complexity to the catalyst monitoring model.

In the present total fuel mass model, negative integrand values in equation (1) may be avoided by computing the total amount of fuel mass injected (FM) to a catalyst following a DFSO event until an HEGO sensor switch. Modifying equation (1), FM may be calculated using equation (3):

$$FM = \int_{t_{start}}^{t_{end}} AM\phi_{in} dt \quad (3)$$

The integration in equation (3) increases catalyst monitoring robustness and accuracy by reducing approximation error and model complexity as compared to previous IAF models. Furthermore, FM computation is not dependent on $AF_{stoich}$, and is thus less sensitive to fuel type. Because the model integrand is dependent on the sensor measured $\phi_{in}$, and not the calibrated AF setpoint, the model is less sensitive to transport delays. Further still, unlike IAF monitor approaches, catalyst monitoring based on equation (3) may be performed during fuel vapor purge.

In the event of increased transport delays, for example in a limousine or other large vehicle, where the distance between the upstream air-fuel sensor and an air-fuel sensor downstream from after-treatment system is large as compared to more regularly sized vehicles, equation (3) can be modified:

$$FM = \int_{t_{start}}^{t_{end}-t_d} AM\phi_{in} dt \quad (4)$$

In equation (4), $t_d$ represents the transport delay, which can be computed based on the air mass flow rate and the distance between the upstream and downstream air-fuel sensors according to equation (5):

$$L = \int_0^{t_d} \frac{AM}{\rho S} dt \qquad (5)$$

In equation 5, $\rho$ may be the average gas density computed using the ideal gas law, S may be the average cross-sectional area of the exhaust pipe between the upstream and downstream air-fuel sensors (e.g., UEGO sensor 126 or sensor 70 and HEGO sensor 76). AM may vary with time, depending, for example on the driver tip-in and vehicle operation following the DFSO until the HEGO switch. Thus, by accounting for the transport delay using equation (5), the presented catalyst monitoring model may be extended and applied to a broad range of UEGO/HEGO after-treatment configurations. For example, the model may be applied to partial volume and full volume systems, as well as large vehicle systems such as limousines.

In an alternative embodiment, the times t1 and t2 in the above equations can compensate for the time delay via an alternative approach.

FIG. 2 shows an example FM classification data plot 200 using an SVM algorithm with Fuzzy C-means clustering that classifies the data into two separate groups, full useful life catalyst (FUL) 210 and threshold catalyst 230. In this example, a set of FM data points calculated for example, from equation (3), have been applied to an SVM algorithm. Using the SVM algorithm, a linear SVM classification plane 220 divides the data points into two classes optimally. In this example, the SVM model achieves 98.95% accuracy, with two misclassifications of FUL catalyst and one misclassification of threshold catalyst out of 143 samples from each group. As shown, the misclassified data points occur near the classifying plane. Because of signal noise and model approximation, and because catalyst degradation is a continuous process, errors in classification may occur near or adjacent to the classifying plane.

Figure 5:
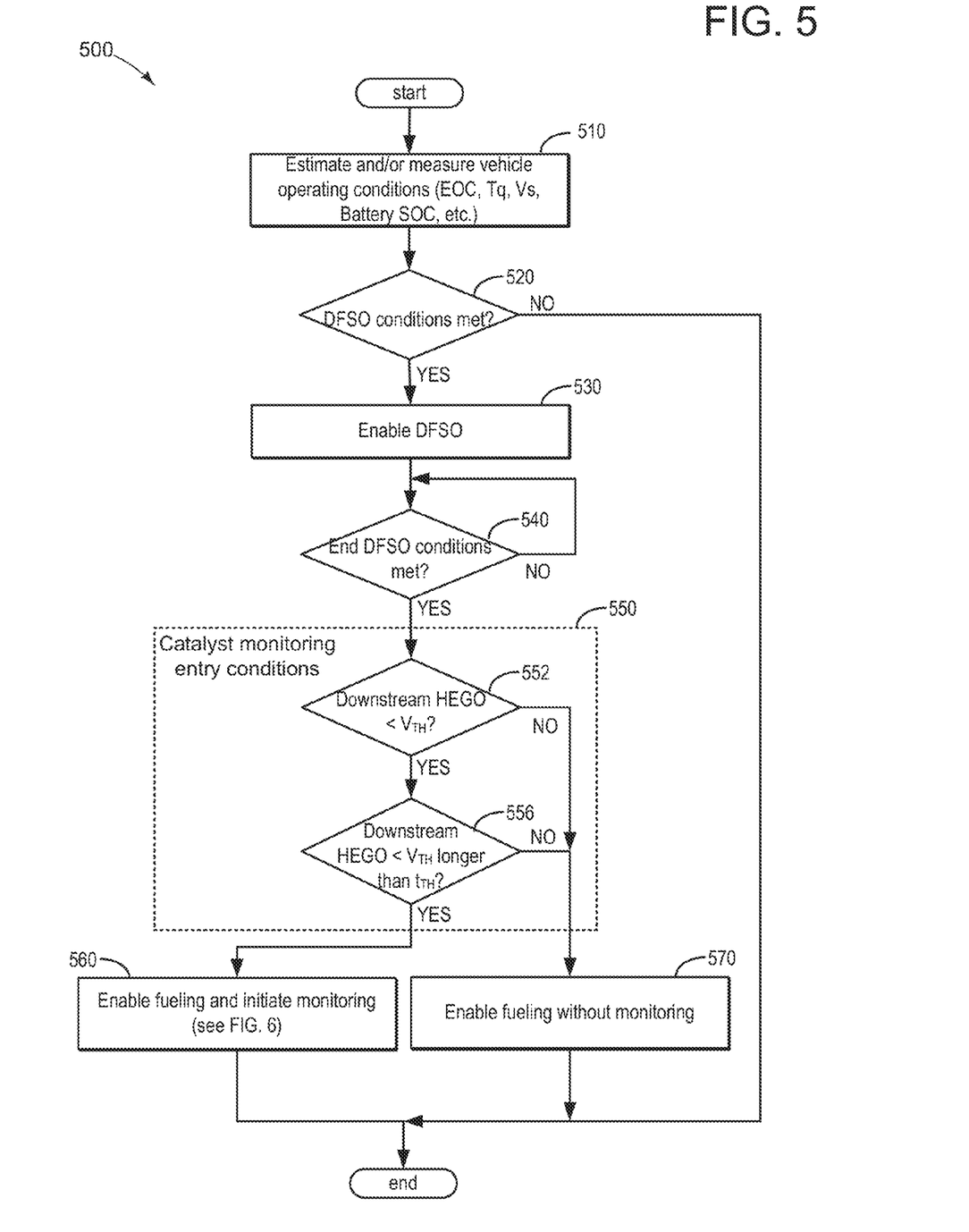
FIGS. 5-7 show flow charts for an example catalyst monitoring method.

Turning to FIG. 3, it illustrates a FM classification data plot 300 for the same FM data set, but using an SVM algorithm with Fuzzy C-means clustering and including a buffer region 254 or band around the classification plane. The buffer region 254 may be calibratable based on the distribution of data, clustering, tolerances for misclassification, and the like. Choosing a wider buffer region, to a certain extent, can increase the accuracy but at the same time may reduce the number of data points for which diagnoses can be made. Consequently, the calibration may depend on the trade-off between error tolerance and desired detection frequency. Data points falling within the buffer region 254 around the classification plane are not classified (e.g., no decision is made on whether the data points in the buffer region belong to the FUL or the threshold class). By including the buffer region 254 defined by classification planes 250, misclassifications near or adjacent to the classifying plane can be reduced, and the model accuracy may be increased. In the example shown in FIG. 3, the model accuracy is increased to 100%. A histogram distribution 400 corresponding to the SVM classification of FIG. 3 is illustrated in FIG. 4, showing the distribution of distances of points from the SVM classifying plane. The 100% accuracy of the model is evidenced by the two distributions for threshold catalyst 420 and FUL catalyst 430 separated on either side the zero distance. For each given data point, the SVM model predicts if it belong to a FUL or a threshold class. In further examples, to avoid misclassification of the catalyst state, the history of the catalyst system may be accounted for by using a weighted sum of the predictions from the last five (or any calibratable number) instances, to make a decision for the current observation. As an example, the weights may be selected to give higher weight to more recent outputs. Turning now to FIG. 5, it illustrates an example method 500 shown for initiating catalyst monitoring following a DFSO event. The engine may be operated substantially at stoichiometry before a DFSO event. Method 500 begins at 510, where vehicle operating conditions such as engine on conditions, torque, vehicle speed, battery state of charge, and the like are estimated and/or measured. At 520, the method 500 determines whether DFSO entry conditions are met. DFSO entry conditions may be based on various vehicle and engine operating conditions estimated and/or measured at 510. In particular, the method 500 may use a combination of one or more of vehicle speed, vehicle acceleration, engine speed, engine load, throttle position, pedal position, transmission gear position, and various other parameters to determine whether the DFSO entry conditions have been met at 520. In one example, the DFSO entry conditions may be based on an engine speed below a threshold engine speed. In another example, the DFSO entry conditions may be based on an engine load below a threshold engine load. In still another example, the DFSO condition may be based on an accelerator pedal position.

If DFSO entry conditions are met at 520, method 500 proceeds to 530 and enables DFSO. During DFSO, the engine is operated without fuel injection while the engine rotates and pumps air through the emission control device. During this time, the catalysts in the emission control device are reactivated with oxygen.

The DFSO event may persist until conditions are met for exiting out of DFSO. For example, a DFSO event may be ended based on a driver tip-in or vehicle speed reaching a threshold vehicle speed. If conditions are not met for ending DFSO at 540, method 500 continues to monitor various engine and vehicle operating parameters which may indicate ending the DFSO event. For example, method 500 may monitor the driver pedal position. Once conditions are met for coming out of DFSO at 540, for example in response to a driver tip-in, vehicle speed reaching a threshold value, and/or engine load reaching a threshold value, method 500 proceeds to 550.

At 550, method 500 determines if catalyst monitoring entry conditions are met to initiate the catalyst monitoring routine. Catalyst monitoring conditions may be associated with determining whether the catalysts are saturated with oxygen. For example, method 500 may determine whether the DFSO duration was sufficiently long enough to sufficiently saturate the catalysts in the emission control device. Indicating that the DFSO event was sufficiently long enough to sufficiently saturate the catalysts may increase accuracy of the catalyst monitoring routine. For example, if the catalyst in the emission device were not sufficiently saturated before running the catalyst monitoring routine, an erroneous indication of degradation may occur. As an example, at 552 method 500 determines if the output voltage from a downstream HEGO sensor is less than a threshold lean voltage $V_{TH}$. An example of a downstream HEGO sensor may be sensor 76. The HEGO sensor output voltage being less than $V_{TH}$ may be one indication that the DFSO duration was sufficiently long to saturate the catalysts. As a further example, method 500 may further determine at 556 if the HEGO sensor output voltage is less than $V_{TH}$ for a time longer than a threshold time, $t_{TH}$. The HEGO sensor output voltage being less than $V_{TH}$ for a time greater than $t_{TH}$ may be a further indication that the DFSO duration was sufficiently long to saturate the catalysts.

Figure 6:
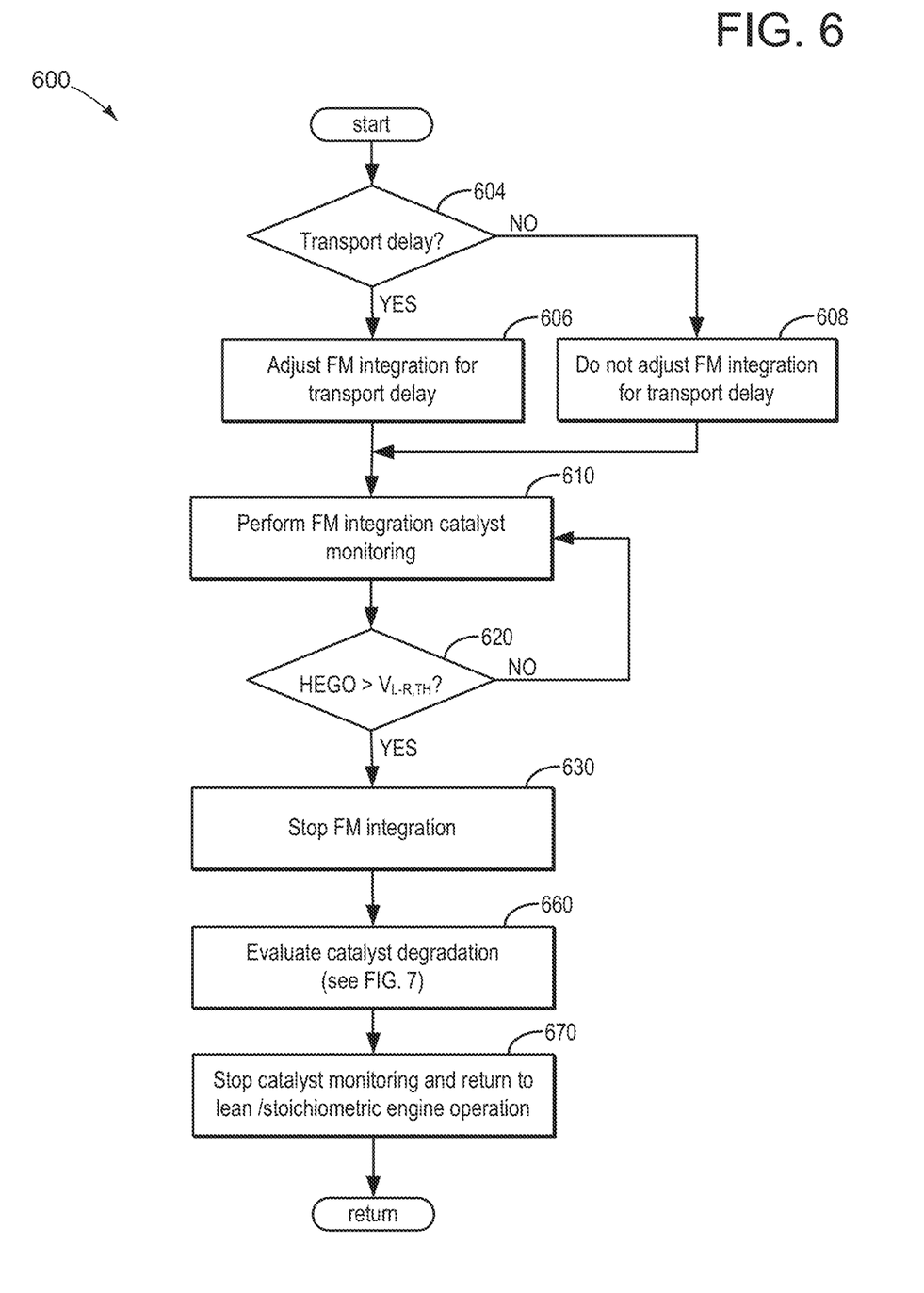

If catalyst monitoring entry conditions are met at 550, then method 500 continues at 560, where fueling is enabled and catalyst monitoring is initiated (see FIG. 6). If catalyst monitoring conditions are not met at 550, for example if either downstream HEGO output voltage is not less than $V_{TH}$, or downstream HEGO output voltage is not less than $V_{TH}$ for a time greater than $t_{TH}$, then method 500 continues from 552 or 556 at 570, where fueling is enabled without monitoring. After 570 method 500 ends.

Next, FIG. 6 illustrates a flow chart for a method 600 for catalyst monitoring that continues from 560. Method 600 begins at 604 where it determines if there is a substantial transport delay. For example, if the catalyst monitoring is for a limousine, where the HEGO downstream of the after-treatment system is farther away from the upstream UEGO sensor as compared to a regular sized vehicle, then a transport delay may exist. For example, method 600 may use equation (5) to estimate or determine a transport delay. If there is no substantial transport method 600 continues at 608 where FM integration is not adjusted for transport delay. For example, method 600 may use equation (3) to compute FM. If there is a substantial transport delay, then method 600 continues at 606, where it adjusts the FM integration for a transport delay. For example, method 600 may use equation (4) to compute FM, accounting for the transport delay. In circumstances where a transport delay may not be determined before the catalyst monitoring is performed (e.g., since transport delay may depend on AM flow rates), the FM integration may be performed using equation (4) and (5). Alternately, the catalyst monitoring integration data may be stored, and the FM computation may be adjusted for transport delay after t2.

Method 600 continues after 606 and 608 at 610 where total fuel mass FM integration is performed. As an example, total fuel mass injected to the catalyst may be calculated by integration according to equation (4) above. At 620, method 600 determines stop monitoring conditions are met. For example, a stop monitoring condition may comprise the output voltage from downstream HEGO sensor being greater than a lean-rich voltage threshold $V_{L-R,TH}$. $V_{L-R,TH}$ may be predetermined or calibrated to indicate a lean to rich transition. As an example $V_{L-R,TH}$ may be set to 0.45 V. If the output voltage from downstream HEGO sensor is not greater than $V_{L-R,TH}$, then injected fuel may still be reacting with oxygen stored in the catalyst, and method 600 may continue performing the FM integration at 610 as part of the catalyst monitoring.

If the output voltage from downstream HEGO sensor is greater than $V_{L-R,TH}$, then the oxygen in the catalyst may be completely reacted as indicated by catalyst break through, and method 600 continues at 630 where the FM integration is stopped. After stopping the FM integration, method 600 continues at 660 where the catalyst degradation is evaluated. As a further example, the catalyst monitoring event may be interrupted by vehicle operation, for example another DFSO event may occur before the stop monitoring condition may be met. If catalyst monitoring is interrupted before the stop monitoring condition is met, then method 600 returns to method 500 after 560 and method 500 ends.

Figure 7:
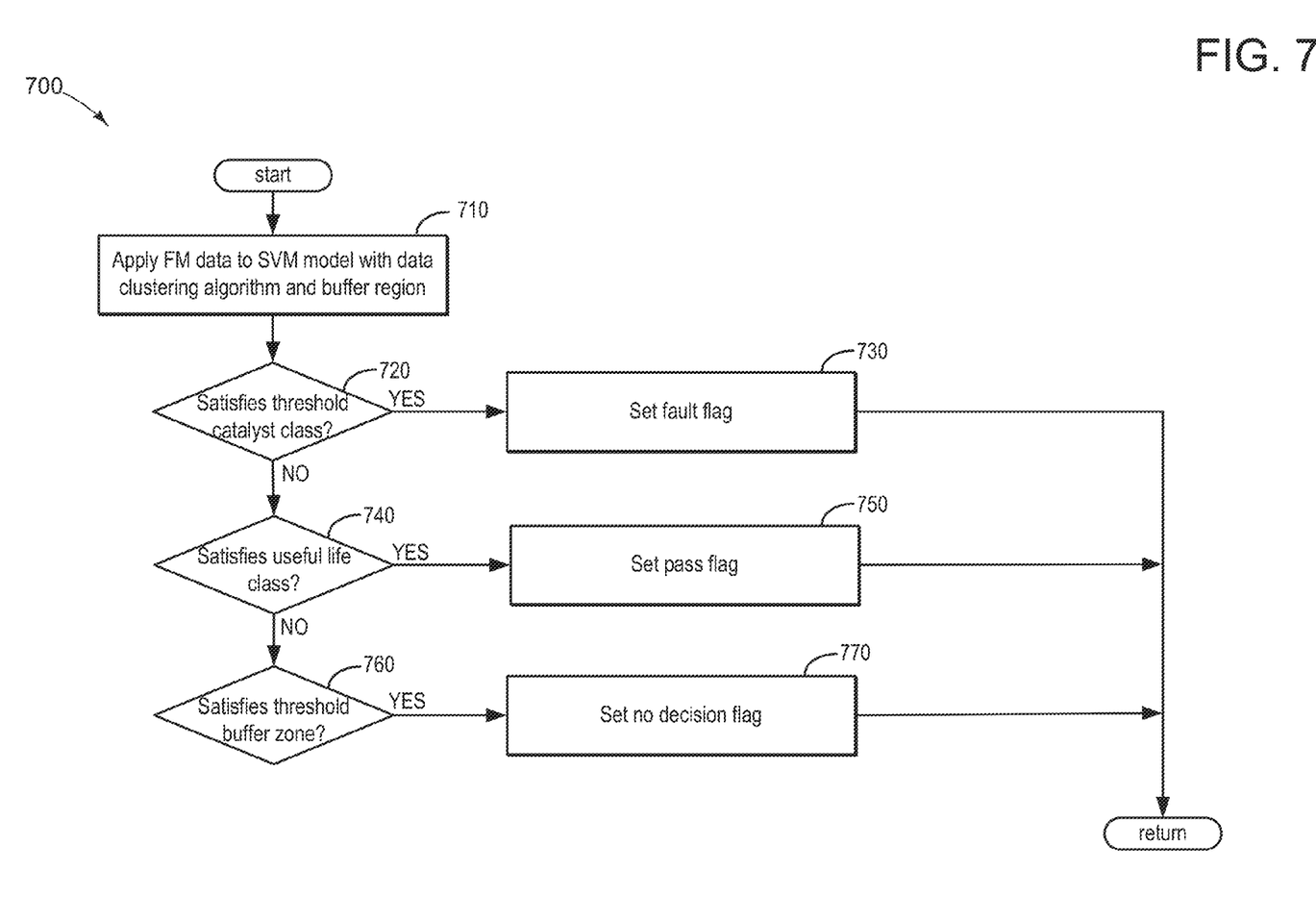
Figure 8:
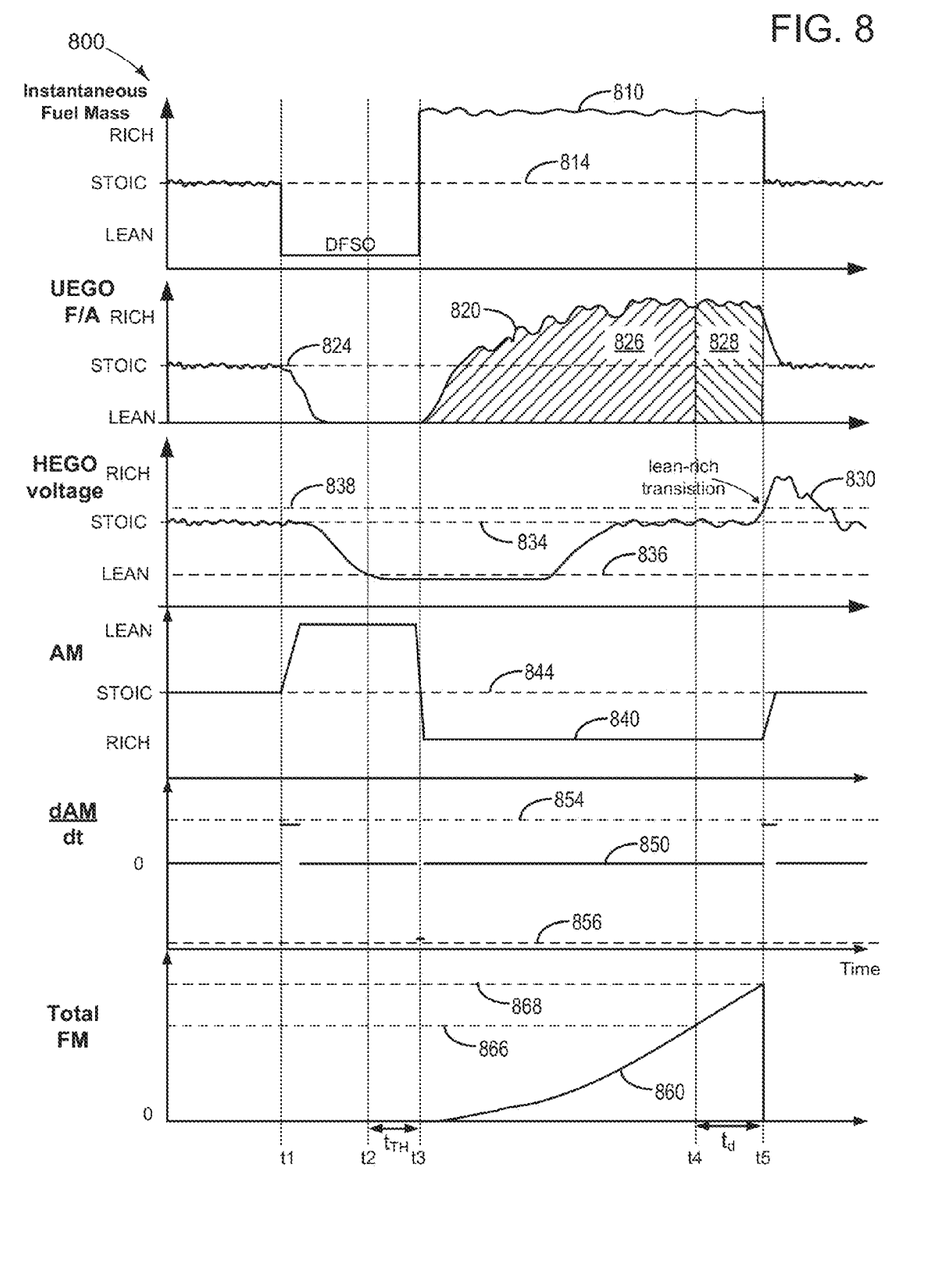
FIG. 8 shows an example timeline for a catalyst monitoring method.

Turning now to FIG. 7 it illustrates a method 700 for assessing catalyst degradation from the FM integration data. Method 700 begins at 710 where it applies the FM data to an SVM model employing a data clustering algorithm and comprising a buffer region calibrated about its classifying plane. As described above, FIG. 3 illustrates an example SVM model comprising a clustering algorithm and a buffer region about its classifying plane. If the FM data satisfies the threshold catalyst class (e.g., threshold region 260 in FIG. 3) at 720, then method 700 proceeds to 730 where a fault flag is set. If the FM data satisfies a useful life class at 740 (e.g., region 240 in FIG. 3), then method 700 proceeds to 750 where a pass flag is set. If the FM data is classified within the buffer zone (e.g., buffer region 254 in FIG. 3) at 760, then method 700 proceeds to 770 where a no decision flag is set. As an example, the catalyst monitoring system may perform a plurality of classifications corresponding to a plurality of DFSO events in order to accurately and robustly classify the catalyst degradation status. In particular, a larger number of classifications may be performed if the catalyst is classified within the buffer zone or near the buffer zone as compared to if the catalyst classification falls clearly within either the threshold or useful life regions. As an example, the results from the plurality of classifications may be averaged, or statistically combined using known methods, to evaluate catalyst degradation. As a further example, a larger number of classifications may be performed when the catalyst is classified as FUL or within the buffer zone in order to more accurately diagnose a threshold catalyst.

Accordingly based on the classification of the FM data via the SVM model, an indication may be provided to the vehicle operator, for example via cluster display device 136. For example, if a fault flag is set a warning indication notifying the operator of catalyst degradation may be provided. As a further example, if the SVM classification determines the catalyst is still within its useful life and a pass flag is set, no indication may be provided to the vehicle operator. As a further example, if the catalyst monitoring results in a classification within the buffer zone, a warning indication notifying the operator of impending catalyst degradation may be provided. Method 700 returns to 660 after 730, 750, and 770. Returning now to method 600 after 660, catalyst monitoring may be stopped and the engine may be returned to lean stoichiometric engine operation at 670. After 670 method 600 returns to method 500 after 560, where method 500 ends.

In this manner, a method of monitoring catalyst performance may comprise applying a set of parameter readings for a given sample to a support vector machine to generate a classification output, clustering the set of parameter readings to reduce a number of support vectors, computing a total fuel mass following a deceleration fuel shut-off event and an exhaust gas oxygen sensor switch, and indicating catalyst degradation based on the total fuel mass. The support vector machine may include a classification plane for generating the classification output, and applying the set of parameter readings may comprise defining a buffer region around the classification plane of the support vector machine where no classification output is generated. Computing the total fuel mass may be based on a universal exhaust gas oxygen sensor positioned upstream from the catalyst, and may comprise integrating a product of an air mass flow and a fuel to air ratio following the deceleration fuel shut-off event until the heated exhaust gas oxygen sensor switch.

The exhaust gas oxygen sensor may be a partial volume sensor or a full volume sensor, and the exhaust gas oxygen sensor switch may comprise a heated exhaust gas oxygen sensor reading below a threshold lean voltage and/or the heated exhaust gas oxygen sensor reading below a threshold lean voltage for a threshold time. Computing the total fuel mass may further comprise integrating the total fuel mass injected after the deceleration fuel shut-off event and the exhaust gas oxygen sensor switch until an end threshold time, the end threshold time corresponding to when the exhaust gas oxygen sensor crosses a lean-rich voltage threshold. Computing the total fuel mass may further comprise integrating the total fuel mass injected following the deceleration fuel shut-off event and the exhaust gas oxygen sensor switch until the end threshold time less a transport delay. The transport delay may be determined based on a distance between the universal exhaust gas oxygen sensor and the exhaust gas oxygen sensor and may be further determined based on an air mass flow to the catalyst. Monitoring the catalyst performance may comprise monitoring the catalyst performance in a boosted engine.

As another example, a method for an engine having a catalytic device and an air-fuel sensor downstream of the catalytic device may comprise performing a fuel-shut-off event while the engine rotates and pumps air through the catalytic device, then, reinitiating fuel injection, if the fuel shut-off event continued sufficiently long for the air-fuel sensor to indicate beyond a lean threshold, estimating a total fuel mass delivered to the catalytic device from the fuel injection re-initiation to a lean-rich downstream air-fuel sensor transition less a transport delay, applying the estimated fuel mass to a support vector machine to generate a classification output, and indicating catalyst degradation based on the classification output.

Estimating the total fuel mass delivered to the catalytic device may comprise estimating the total fuel mass based on an air mass flow to the catalytic device and an upstream air-fuel sensor. Furthermore, the support vector machine may include a clustering algorithm to reduce a number of support vectors defining a classification plane, and the transport delay may be determined based on a distance between an upstream air-fuel sensor and a downstream air-fuel sensor. Further still, a rate of change in air mass flow may be maintained below a threshold rate of change.

Turning now to FIG. 8, it illustrates a timeline 800 showing trends in vehicle operating conditions for performing a catalyst monitoring method following a DFSO event. Variations in engine instantaneous fuel mass 810 from rich to lean operation are shown alongside stoichiometric FM 814, upstream UEGO fuel to air ratio 820 during rich and lean operation is plotted alongside stoichiometric UEGO fuel to air ratio 824, and downstream HEGO voltage 830 during rich and lean operation is plotted alongside stoichiometric HEGO fuel to air ratio 834. Furthermore, a lean threshold voltage, $V_{TH}$ is plotted at 836 and a lean to rich threshold voltage $V_{L-R,TH}$ is plotted at 838. Also shown in FIG. 8 are variations in air mass AM 840 entering the catalyst, the rate of change in AM 850, and the total (integrated) fuel mass 860. Also plotted in FIG. 8 are a stoichiometric AM 844 level, and threshold rates of change in AM 844 and 856. The example air-fuel signals shown in FIG. 8 may be signals from HEGO, UEGO, or any suitable exhaust gas sensors.

Prior to t1, the vehicle may be running at stoichiometric engine operation. At t1, a DFSO event may be initiated, for example while coasting downhill, resulting in a drop in instantaneous fuel mass 810, and a reduction in fuel to air ratio both at UEGO and HEGO upstream and downstream, respectively, of the catalyst. As shown in FIG. 8, the response of HEGO fuel to air ratio may be slower than the response of UEGO fuel to air ratio. The DFSO event may persist until conditions are met for exiting out of DFSO. For example, the DFSO event may be ended as shown at t3 based on a driver tip-in or vehicle speed reaching a threshold vehicle speed, where instantaneous fuel mass 810 increases above stoichiometric engine operation levels. As described above, whether or not the catalyst monitoring routine is initiated depends on whether the DFSO duration was long enough to sufficiently saturate the catalysts in the emission device. Sufficient saturation of the catalyst may be determined by catalyst monitoring entry conditions, such as by whether the downstream air-fuel sensor reads sufficiently lean (e.g. below a threshold voltage $V_{TH}$ 836) for a sufficiently long time (e.g., greater than a threshold time $t_{TH}$). At t2, the HEGO fuel to air ratio decreases below $V_{TH}$ 836, and remains below $V_{TH}$ until t3 after which a threshold time $t_{TH}$ has passed, thus initiating catalyst monitoring.

At t3, catalyst monitoring may be started because catalyst monitoring entry conditions are met as described above. In response to the driver-tip in and increase in FM injection, UEGO fuel to air ratio 820 begins to increase at t3, and HEGO voltage 830 begins to increase sometime after t3. Also, the total FM 860 begins to increase monotonically as the integration of the instantaneous fuel mass begins during catalyst monitoring. Catalyst monitoring continues until t5, when HEGO voltage 830 increases above a threshold lean to rich voltage $V_{L-R,TH}$, signaling catalyst breakthrough. At t5, the catalyst monitoring is stopped, and engine operation may be returned to stoichiometric operation to reduce the amount of hydrocarbon emissions. Thus after t5, instantaneous fuel mass 810, UEGO fuel to air ratio 820, and HEGO voltage 830 return to stoichiometric levels. Furthermore, total FM 860 may be reset to 0 at t5 after storing the total FM data for application to the SVM model and for evaluation of catalyst degradation.

During initiation of DFSO and driver tip-in, the rate of change in AM 850 may be limited below thresholds 854 and 856 respectively. For example, thresholds 854 and/or 856 may be calibrated so that the UEGO sensor is limited to a threshold lambda value, where lambda may be the ratio of the air to fuel ratio to the stoichiometric air to fuel ratio. For example, the threshold lambda value may be less than 2.5. Above the threshold lambda value, the UEGO sensor may not be reliable. For example, the air to fuel ratio may be outside of the reliable measuring range of the UEGO sensor when lambda is above a threshold lambda value.

As described above in equations (3) to (5), fuel mass injected to the catalyst may be estimated by integrating the product of the UEGO fuel to air ratio and the air mass entering the catalyst from $t_{start}$ after a DFSO event until an HEGO sensor switch from lean to rich at $t_{end}$. In FIG. 8, t3 may correspond to $t_{start}$, and t5 may correspond to $t_{end}$. As shown in the example scenario of FIG. 8, a transport delay $t_d$, may exist because of the distance between the upstream UEGO sensor and the downstream HEGO sensor. The transport delay may be estimated according to equation (5). Then, according to equation (4), the FM integration is performed from the end of the DFSO event at t3 until t4 (e.g., t5-$t_d$).

As shown in FIG. 8, a transport delay can impact catalyst monitoring since a catalyst breakthrough may not be responsively measured by the downstream HEGO sensor due to the length of distance it is positioned away from the upstream UEGO sensor. In this case, if a transport delay is not accounted for, the catalyst monitoring may overestimate the amount of fuel injected to the catalyst and reacting with oxygen stored in the catalyst prior to catalyst break through. As an example, a degraded threshold catalyst may be misclassified as a useful life catalyst if a transport delay is large and is not accounted for in the catalyst monitoring method, resulting in increased hydrocarbon emissions.

Shaded region 826 represents the integral of the UEGO signal (e.g., $\phi_{in}$ term in equation (4)) from t3 to t4, accounting for the transport delay, and the corresponding total FM 860 from t3 to t4 is shown by 866. If the transport delay is not accounted for, the integral of the UEGO signal would be evaluated from t3 to t5 (e.g., from equation (3)), as shown by summing shaded regions 826 and 828. The corresponding total FM 860 from t3 to t5 is shown by 868. If shaded region 828 (resulting from the transport delay) is significant relative to shaded region 826, then catalyst degradation may not be reliably determined, as represented by the discrepancy between 868 and 866. Thus, by accounting for the transport delay in the catalyst monitoring method according to equations (4) and (5), the catalyst degradation can be reliably determined. After the fuel mass injected to the catalyst is estimated, the SVM model may be applied as described above and as shown in FIG. 3. For example, if the computed fuel mass falls within the threshold region 260, then an indication of catalyst degradation may be provided.

In this manner, a system for monitoring an emission control device coupled to a combustion engine may comprise an air-fuel sensor coupled downstream of a volume of catalyst material of the emission control device, a control system having a computer storage medium with instructions encoded thereon. The instructions may comprise instructions to initiate a deceleration fuel shut-off based on an engine operating condition, following the deceleration fuel shut-off, instructions to begin fueling in response to a driver tip-in, following the driver tip-in, instructions estimate a total amount of fuel mass delivered from the beginning of the fueling to a switch of the air-fuel sensor from lean to rich less a transport delay, instructions to apply the estimated total amount of fuel mass to a support vector machine to generate a classification output, and instructions to indicate catalyst degradation based on the classification output. The support vector machine may include a clustering algorithm for reducing a number of support vectors defining a classification plane, and a buffering region around the classification plane in which no classification output is generated.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of monitoring catalyst performance, comprising:
   computing a total fuel mass following a deceleration fuel shut-off event and an exhaust gas oxygen sensor switch;
   applying the computed total fuel mass to a support vector machine to generate a classification output, the support vector machine including a clustering algorithm configured to reduce a number of support vectors;
   indicating catalyst degradation based on the classification output.

2. The method of claim 1, wherein the support vector machine includes a classification plane for generating the classification output, and a buffer region around the classification plane where no classification output is generated.

3. The method of claim 1, wherein computing the total fuel mass is based on a universal exhaust gas oxygen sensor positioned upstream from the catalyst.

4. The method of claim 3, wherein computing the total fuel mass comprises integrating a product of an air mass flow and a fuel to air ratio following the deceleration fuel shut-off event until the exhaust gas oxygen sensor switch.

5. The method of claim 4, wherein the exhaust gas oxygen sensor is a partial volume sensor.

6. The method of claim 4, wherein the exhaust gas oxygen sensor is a full volume sensor.

7. The method of claim 4, wherein the exhaust gas oxygen sensor switch comprises a heated exhaust gas oxygen sensor reading below a threshold lean voltage.

8. The method of claim 7, wherein the exhaust gas oxygen sensor switch comprises the heated exhaust gas oxygen sensor reading below a threshold lean voltage for a threshold time.

9. The method of claim 8, wherein computing the total fuel mass further comprises integrating the total fuel mass injected after the deceleration fuel shut-off event and the exhaust gas oxygen sensor switch until an end threshold time, the end threshold time corresponding to when the exhaust gas oxygen sensor crosses a lean-rich voltage threshold.

10. The method of claim 9, wherein computing the total fuel mass further comprises integrating the total fuel mass injected following the deceleration fuel shut-off event and the exhaust gas oxygen sensor switch until the end threshold time less a transport delay.

11. The method of claim 10, wherein the transport delay is determined based on a distance between the universal exhaust gas oxygen sensor and the exhaust gas oxygen sensor.

12. The method of claim 11, wherein the transport delay is further determined based on an air mass flow to the catalyst.

13. The method of claim 1, wherein monitoring the catalyst performance comprises monitoring the catalyst performance in a boosted engine.

14. A method for an engine having a catalytic device and an air-fuel sensor downstream of the catalytic device, comprising:
   performing a fuel-shut-off event while the engine rotates and pumps air through the catalytic device, then;
   re-initiating fuel injection;
   if the fuel shut-off event continued sufficiently long for the air-fuel sensor to indicate beyond a lean threshold, estimating a total fuel mass delivered to the catalytic device from the fuel injection re-initiation to a lean-rich downstream air-fuel sensor transition less a transport delay;
   applying the estimated fuel mass to a support vector machine to generate a classification output; and indicating catalyst degradation based on the classification output.

15. The method of claim 14, wherein estimating the total fuel mass delivered to the catalytic device comprises estimating the total fuel mass based on an air mass flow to the catalytic device and an upstream air-fuel sensor.

16. The method of claim 14, wherein the support vector machine includes a clustering algorithm to reduce a number of support vectors defining a classification plane.

17. The method of claim 15, wherein the transport delay is determined based on a distance between an upstream air-fuel sensor and a downstream air-fuel sensor.

18. The method of claim 16, wherein a rate of change in air mass flow is maintained below a threshold rate of change.

19. A system for monitoring an emission control device coupled to a combustion engine, comprising:
  an air-fuel sensor coupled downstream of a volume of catalyst material of the emission control device;
  a control system having a computer storage medium with instructions encoded thereon, the instructions comprising:
    instructions to initiate a deceleration fuel shut-off based on an engine operating condition;
    following the deceleration fuel shut-off, instructions to begin fueling in response to a driver tip-in;
    following the driver tip-in, instructions estimate a total amount of fuel mass delivered from the beginning of the fueling to a switch of the air-fuel sensor from lean to rich less a transport delay;
    instructions to apply the estimated total amount of fuel mass to a support vector machine to generate a classification output; and
    instructions to indicate catalyst degradation based on the classification output.

20. The system of claim 19 wherein the support vector machine includes a clustering algorithm for reducing a number of support vectors defining a classification plane, and a buffering region around the classification plane in which no classification output is generated.

* * * * *